(No Model.)
C. PRICE.
CLOTHES DRIER.
No. 585,228. Patented June 29, 1897.
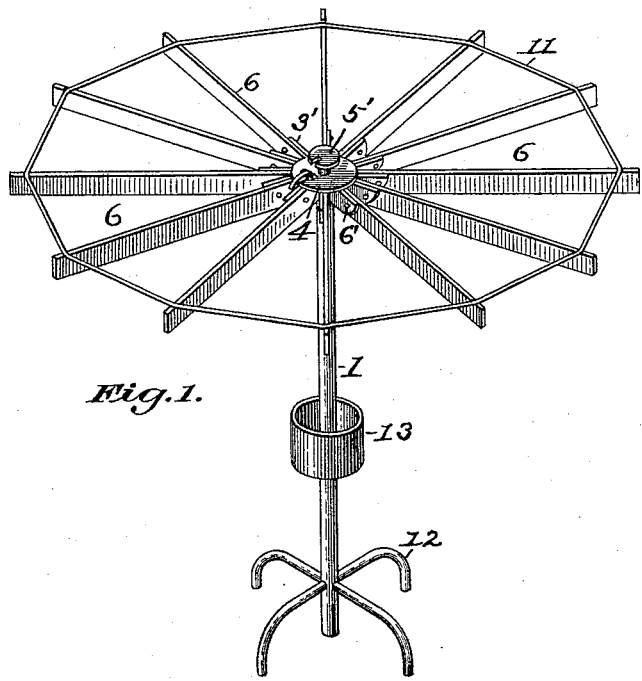
Fig.1.
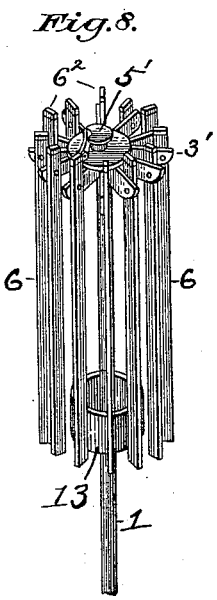
Fig.8.
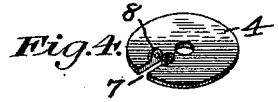
Fig.2.
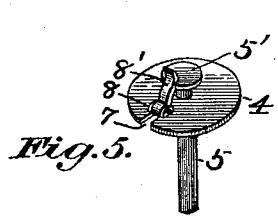
Fig.4.
Fig.5.
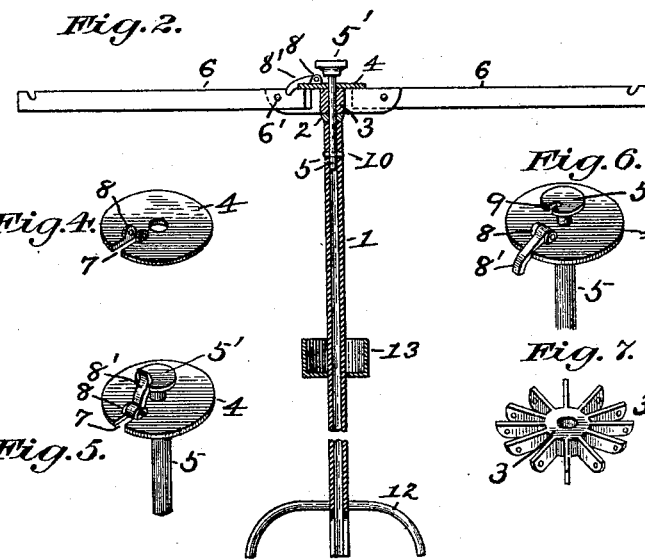
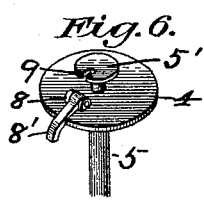
Fig.6.
Fig.7.
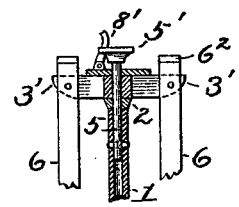
Fig.3.
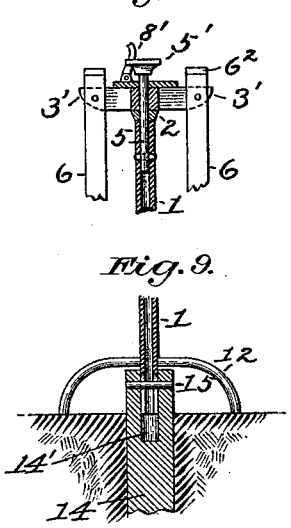
Fig.9.
Witnesses;
O. W. Smith
O. A. Dickey
Inventor;
Cyrus Price,
By his Attorney,
Eugene L. Arnott

UNITED STATES PATENT OFFICE.

CYRUS PRICE, OF GREENFIELD, OHIO.

CLOTHES-DRIER.

SPECIFICATION forming part of Letters Patent No. 585,228, dated June 29, 1897.

Application filed November 4, 1895. Serial No. 567,863. (No model.)

*To all whom it may concern:*

Be it known that I, CYRUS PRICE, a citizen of the United States, residing at Greenfield, in the county of Highland and State of Ohio, have invented certain new and useful Improvements in Clothes-Driers, of which the following is a specification, reference being had to the accompanying drawings.

The object of the invention is to produce an improved clothes-drier of the character set forth which will be useful for supporting clothes out of doors when washing and indoors when ironing, &c.

The novelty of the invention will be more specifically pointed out in the claims.

In the accompanying drawings, Figure 1 is a perspective view of my improved clothes-drier. Fig. 2 is a vertical sectional view. Fig. 3 is a vertical sectional view, the arms being shown in their lowered position and the post and arms being broken. Fig. 4 is a perspective view of plate 4. Fig. 5 is a perspective view of plate 4 and pin 5 with head 5', the dog 8' being turned up. Fig. 6 is a similar view, the dog 8' being turned down. Fig. 7 is a perspective view of hub or collar 3 with arms 3'. Fig. 8 is a perspective view showing the arms in their lower or folded position. Fig. 9 is a detail view, in vertical section, showing how the post may be secured in the ground.

The same reference-figures represent identical parts in the different views.

The post 1 is preferably made of iron tubing. A ring or collar 2 rests upon the upper end of post 1. A hub or collar 3, which has radial arms 3', rests upon collar 2. A circular plate 4 rests upon hub or collar 3. A pin 5, which has a head 5', passes down through plate 4, hub or collar 3, collar 2, and into the upper end of post 1, as shown in Fig. 2. Ring 2, hub 3, and plate 4 are free to revolve around pin 5.

Each radial arm 3' carries a longer arm 6, preferably made of wood. Each arm 6 is pivotally attached to an arm 3', the pivot being shown at 6'. The inner ends of arms 6 extend almost to the inner ends of arms 3'.

When the arms 6 are in their extended or elevated position, as shown in Fig. 1, their inner ends are under plate 4.

Plate 4 has a notch or slot 7 at one side. A lug 8 projects up from plate 4 in line with either side of notch 7. A dog 8' is pivoted at one end between lugs 8. The head 5' of pin 5 has a notch 9 at one side.

When it is desired to lower or fold the arms 6, as shown in Fig. 8, the dog 8' is turned up and placed in notch 9 of head 5', as shown in Figs. 3 and 5. This secures plate 4 against rotation around pin 5. Pin 5 is rigidly held by pin 10 or otherwise in post 1. The hub 3, carrying the arms 3' and 6, is then rotated around pin 5, and the inner end of each arm 6, when it comes in position, passes up through notch 7 and the outer end drops down to the position shown in Figs. 3 and 8.

When it is desired to raise or open the arms 6, the dog 8' is left in notch 9, the hub 3 is rotated by means of arms 6, and each arm is elevated when its inner end comes opposite notch 7. As soon as the inner end of the arm has passed down through notch 7 the hub is rotated farther and the inner end of the arm is held under plate 4. When all the arms have been raised in this manner, the dog 8' is turned down, as shown in Figs. 1, 2, and 6, its outer end resting in notch 7 and between two arms 3'. The plate 4 is thus coupled to hub or collar 3 and compelled to rotate with it, and the inner ends of arms 6 cannot reach notch 7 until dog 8' is again raised up, no matter how often hub 3 and the arms may be rotated around pin 5. This is important, because it is often desirable to turn the drier around when hanging clothes upon the arms.

A rope 11 is preferably secured to the outer ends of arms 6. This rope braces the arms, and may also be used to hang clothes upon. The inner ends of arms 6 are preferably capped with iron bands $6^2$, so that there will be less friction and wear against the under side of plate 4. The arms 6 and rope 11 form the equivalent of a long clothes-line in a comparatively small space.

Near the bottom of post 1 a suitable base, consisting, preferably, of legs 12, is provided for supporting the drier indoors.

A circular vessel 13 is secured upon post 1. This vessel may have its top only partly closed and is a convenient receptacle for the clothes-pins and the rope 11. It also forms a rest for arms 6 when in their folded position.

When placing the clothes-drier out of doors, where it is exposed to the wind, it may be better in some cases to use an additional support. A post or plug 14, preferably of wood, with vertical hole 14', may be permanently placed in the ground and the lower end of post 1 may be removably inserted in it. Post 14 may have a transverse pin 15 across hole 14', and the lower end of post 1 is slotted to fit over this pin.

Having thus fully described my invention, what I claim as new, and desire to secure by Letters Patent, is—

1. In a clothes-drier, the combination, with a post, of a hub having a central bearing such as pin 5, the pivoted arms carried by said hub, and the plate above said hub, said plate having a notch at one side, the inner ends of said arms being held down by said plate, when desired, and said notch being adapted for the passage of said inner ends of the arms, when desired, substantially as set forth.

2. In a clothes-drier, the combination, with a post, of a hub having a central bearing such as pin 5, the pivoted arms carried by said hub, the plate above said hub, said plate having a notch at one side, the inner ends of said arms being held down by said plate, and said notch being adapted for the passage of said inner ends of the arms, and a dog causing the plate to revolve with the arms when said dog is turned down, substantially as set forth.

3. In a clothes-drier, the combination, with a post, of a hub having a central bearing such as pin 5, the pivoted arms carried by said hub, the plate above said hub, said plate having a notch at one side, and means to hold said plate against rotation, substantially as set forth.

4. In a clothes-drier, the combination, with a post, of the hub 3, having a central bearing such as pin 5, the pivoted arms 6 carried by said hub, the plate 4, having the notch 7, and means to cause said plate to rotate with the arms, substantially as set forth.

5. In a clothes-drier, the combination, with a post, of a hub 3, having a central bearing such as pin 5, the pivoted arms 6 carried by said hub, the plate 4, having the notch 7, means to cause said plate to rotate with the arms, or to hold said plate against rotation, substantially as set forth.

6. In a clothes-drier, the combination, with a post, of a hub 3, the pivoted arms 6 carried by said hub, the plate 4, having the notch 7, the pin 5 passing down through said plate and hub, the head 5' on said pin having the notch 9, and the dog 8' adapted to rest in said notch 9, substantially as set forth.

In testimony whereof I subscribe my name in the presence of two witnesses.

CYRUS PRICE.

Witnesses:
WM. H. ECKMAN,
CHAS. PURSEL.